United States Patent
Kierat

(10) Patent No.: US 9,745,861 B2
(45) Date of Patent: Aug. 29, 2017

(54) EXHAUST-GAS TURBOCHARGER

(71) Applicant: BorgWarner Inc., Auburn Hills, MI (US)

(72) Inventor: Jaroslaw Kierat, Frankenthal (DE)

(73) Assignee: BorgWarner Inc., Auburn Hills, MI (US)

( * ) Notice: Subject to any disclaimer, the term of this patent is extended or adjusted under 35 U.S.C. 154(b) by 285 days.

(21) Appl. No.: 14/440,979

(22) PCT Filed: Nov. 7, 2013

(86) PCT No.: PCT/US2013/068899
§ 371 (c)(1),
(2) Date: May 6, 2015

(87) PCT Pub. No.: WO2014/081577
PCT Pub. Date: May 30, 2014

(65) Prior Publication Data
US 2015/0300246 A1 Oct. 22, 2015

(30) Foreign Application Priority Data
Nov. 20, 2012 (DE) .......... 10 2012 022 658

(51) Int. Cl.
*F01D 17/16* (2006.01)
*F02B 37/24* (2006.01)
*F01D 25/16* (2006.01)

(52) U.S. Cl.
CPC .......... *F01D 17/165* (2013.01); *F01D 17/162* (2013.01); *F01D 25/16* (2013.01); *F02B 37/24* (2013.01); *F05D 2220/40* (2013.01); *Y02T 10/144* (2013.01)

(58) Field of Classification Search
CPC .................................................. F01D 17/165
See application file for complete search history.

(56) References Cited

U.S. PATENT DOCUMENTS

| 2002/0168262 | A1 | 11/2002 | Jinnai |
| 2007/0068155 | A1 | 3/2007 | Hayashi et al. |
| 2010/0124489 | A1* | 5/2010 | Suzuki .................. F01D 17/165 415/150 |
| 2010/0150701 | A1 | 6/2010 | Simon et al. |

FOREIGN PATENT DOCUMENTS

JP    2004138006 A    5/2004

OTHER PUBLICATIONS

International Search Report in Internation Application No. PCT/US2013/068899, dated Feb. 6, 2014.

* cited by examiner

*Primary Examiner* — Richard Edgar
(74) *Attorney, Agent, or Firm* — Eric L. Doyle; Stephan A. Pendorf; Patent Central LLC

(57) ABSTRACT

An exhaust-gas turbocharger (1) having a turbine (2) which has a turbine wheel (3) surrounded by an inflow duct (4), and having a VTG cartridge (5), which VTG cartridge has a disk and a vane bearing ring (7) which delimit the inflow duct, and which VTG cartridge has a multiplicity of vanes (6) which are arranged in the inflow duct (4) and which are mounted in the vane bearing ring (7) by way of rotatable vane shafts (9), which vane shafts are connected to vane levers (10), the lever heads (11) of which engage into associated grooves (12) in an adjusting ring (13). The adjusting ring (13) is guided by at least one bearing (8) which is arranged on one of the vane shafts (9).

8 Claims, 2 Drawing Sheets

EXHAUST-GAS TURBOCHARGER

Figure 1:
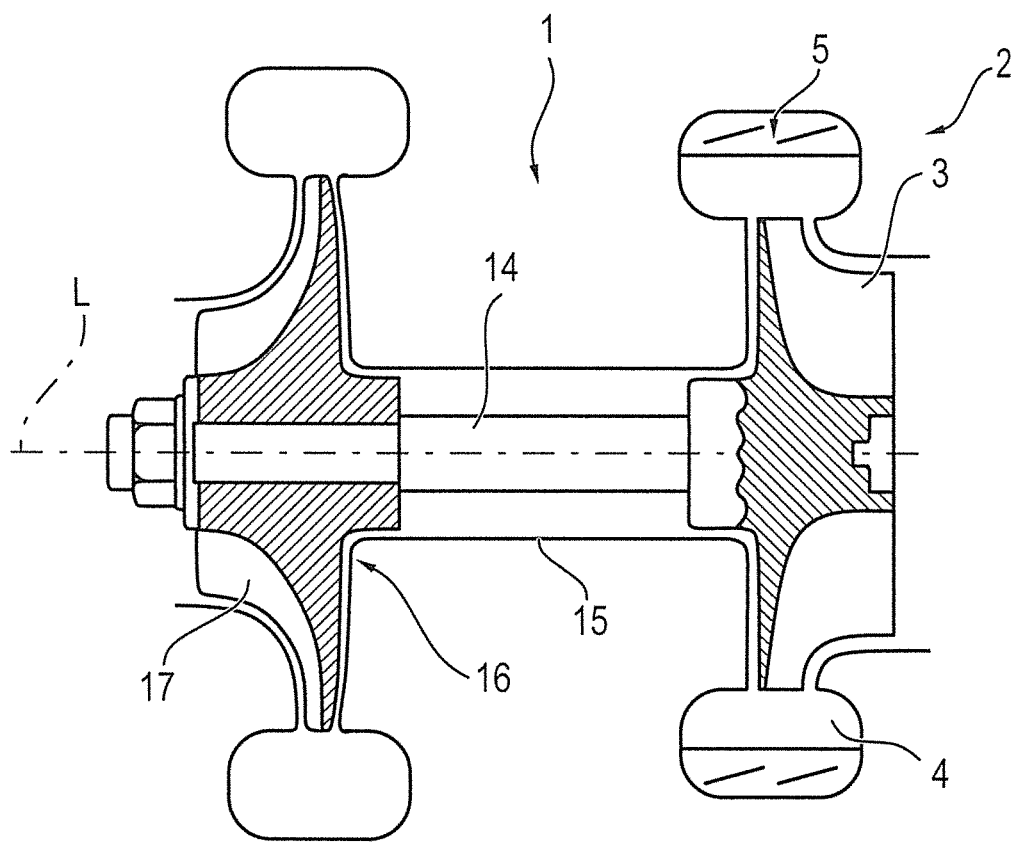

The invention relates to an exhaust-gas turbocharger according to the preamble of claim 1.

In the case of such an exhaust-gas turbocharger, provision is made of a variable turbine geometry (VTG), in which guide vanes are adjusted by means of an adjusting ring. In order to be able to provide the best possible control, the least possible hysteresis and thus the least possible friction of the system is desirable. The radial bearing of the adjusting ring also has an influence on this, for example.

In view of this, it is an object of the present invention to provide an exhaust-gas turbocharger of the type indicated in the preamble of claim 1, the structure of which has a simpler and thus more cost-effective design.

This object is achieved by the features of claim 1.

The dependent claims contain advantageous developments of the invention.

According to the invention, for mounting purposes, it is possible for rolling bodies, bearing sleeves or the like to be fitted on at least one of the vane shafts and utilized for the mounting of the adjusting ring. In principle, it is also possible for such bearing elements to be provided on all of the vane shafts or only on certain selected vane shafts.

Claims 5 and 6 define a VTG cartridge according to the invention as an object which can be marketed independently.

Figure 2:
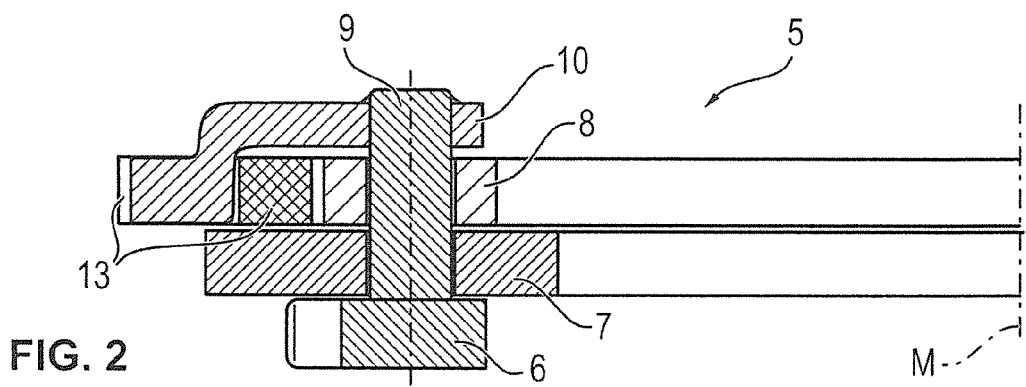
Figure 3:
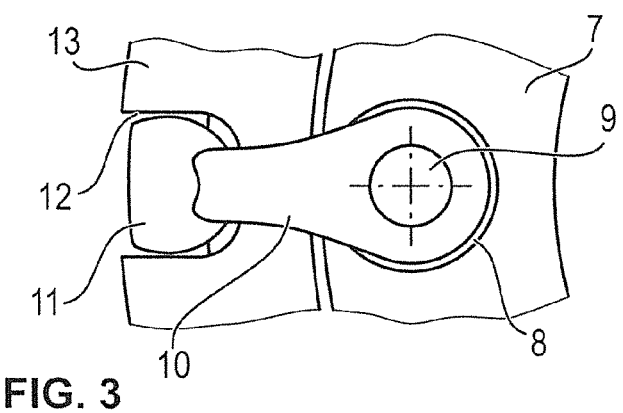
Figure 4:
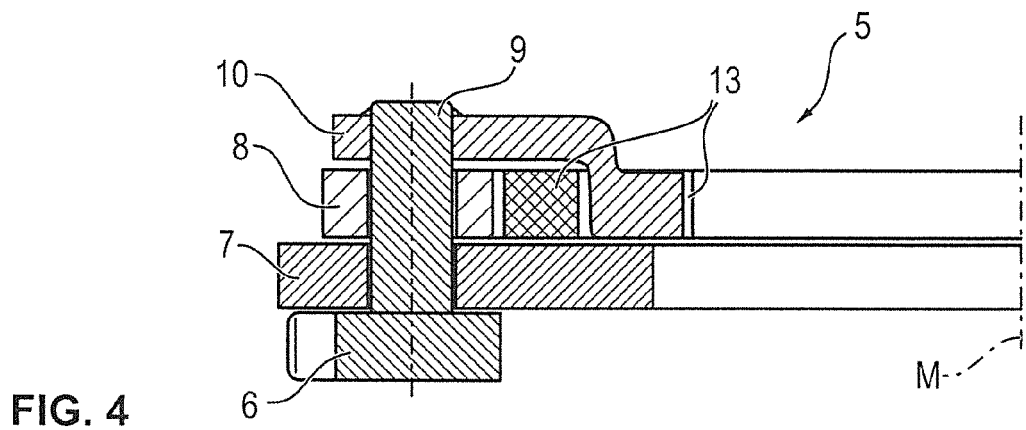
Figure 5:
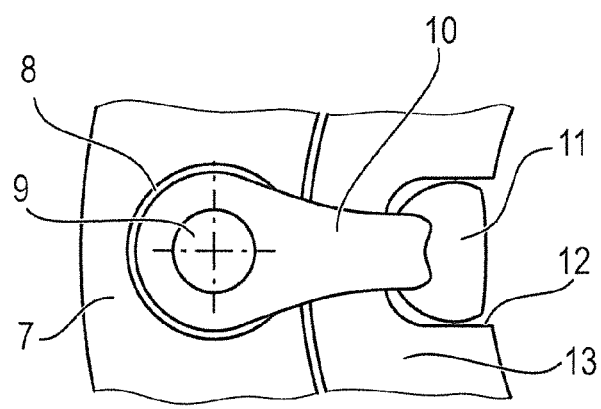

Further details, features and advantages of the invention become apparent from the following description of exemplary embodiments with reference to the drawing, in which:

FIG. 1 shows a schematically greatly simplified illustration of an exhaust-gas turbocharger according to the invention, FIG. 2 shows a sectional illustration of a part of the cartridge, sectioned along the center line of said cartridge, FIG. 3 shows a plan view of a part of the VTG cartridge as per FIG. 2, FIG. 4 shows an illustration, corresponding to FIG. 2, of a second embodiment, and FIG. 5 shows an illustration, corresponding to FIG. 3, of the embodiment as per FIG. 4.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an inflow duct 4 which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a shaft 14, which is mounted rotatably in a bearing housing 15 and which bears the turbine wheel 3 at one end and a compressor wheel 17 of a compressor 16 at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 5, is likewise shown in greatly schematically simplified form.

A VTG cartridge is understood to mean a structural unit which, between a vane bearing ring 7 and a disk (not illustrated), delimits the inflow duct 4 for the passage of exhaust gases to the turbine wheel 3. A VTG cartridge of said type also has a multiplicity of vanes 6 which are arranged in the inflow duct 4. The vanes 6 can be moved rotatably in a vane bearing ring 7 between a closed and an open position. For this purpose, the vanes have vane shafts 9 each having an axis of rotation. The vane shafts 9 in turn are connected to vane levers 10, of which in each case one vane lever is denoted in FIGS. 2 to 6 with the reference numeral 10. In the case of a VTG cartridge 5, it is possible, for example, for ten such vane levers which are each formed identically and are preferably offset to be provided.

Each vane lever 10 has a lever head 11, which engages into an associated groove 12 in an adjusting ring 13. Here, FIG. 2 shows that the adjusting ring 13 surrounds the vane bearing ring 7 at the outside, that is to say along the outer circumference of the latter, whereas in FIG. 5, said adjusting ring is arranged, in a second possible embodiment, within the vane bearing ring 7.

For the mounting of the adjusting ring 13, provision is made of a bearing which, according to the invention, is formed by at least one rolling element 8 which is arranged on a vane shaft 9 of the cartridge 5. As explained in the introduction, it is also possible for all of the vane shafts 9 to be provided with such bearing elements, or for only a selected subset of the vane shafts 9 to be provided with the bearing elements 8.

The bearing elements 8 are preferably formed as bearing sleeves of simple construction.

In addition to the above written disclosure, reference is hereby explicitly made to the illustrative representation of the invention in FIGS. 1 to 5 to supplement the disclosure of the invention.

LIST OF REFERENCE SIGNS

1 Exhaust-gas turbocharger
2 Turbine
3 Turbine wheel
4 Inflow duct
5 VTG cartridge
6 Vane
7 Vane bearing ring
8 Bearing/bearing sleeve
9 Vane shaft
10 Vane lever
11 Lever heads
12 Groove
13 Adjusting ring
14 Shaft
15 Bearing housing
16 Compressor
17 Compressor wheel
L Charger longitudinal axis
M Central axis of the cartridge

The invention claimed is:
1. An exhaust-gas turbocharger (1) having
a turbine (2)
which has a turbine wheel (3) surrounded by an inflow duct (4), and
a VTG cartridge (5),
which VTG cartridge has a disk and a vane bearing ring (7) which delimit the inflow duct, and
which VTG cartridge has a multiplicity of vanes (6) which are arranged in the inflow duct (4) and which are mounted in the vane bearing ring (7) by way of rotatable vane shafts (9), which vane shafts are connected to vane levers (10), the lever heads (11) of which engage into associated grooves (12) in an adjusting ring (13),
wherein the adjusting ring (13) is guided by at least one bearing (8) which is arranged on one of the vane shafts (9).

2. The exhaust-gas turbocharger as claimed in claim 1, wherein the bearing is in the form of a bearing sleeve.

3. The exhaust-gas turbocharger as claimed in claim 1, wherein a bearing (8) is arranged on each of the vane shafts (9) or on a subset of the vane shafts (9).

4. The exhaust-gas turbocharger as claimed in claim 1, wherein the adjusting ring (13) surrounds the vane bearing ring (7) at the outside or is arranged within the vane bearing ring (7).

5. A VTG cartridge (5) of an exhaust-gas turbocharger (1), having
- a disk and a vane bearing ring (7) which delimit an inflow duct (4),
- a multiplicity of vanes which are arranged in the inflow duct (4) and which are mounted in the vane bearing ring (7) by way of rotatable vane shafts (9), which vane shafts are connected to vane levers (10), the lever heads (11) of which engage into associated grooves (12) in an adjusting ring (13),
- wherein
- the adjusting ring (13) is guided by at least one bearing (8) which is arranged on one of the vane shafts (9).

6. The VTG cartridge as claimed in claim 5, wherein the bearing is in the form of a bearing sleeve.

7. The VTG cartridge as claimed in claim 5, wherein a bearing (8) is arranged on each of the vane shafts (9) or on a subset of the vane shafts (9).

8. The VTG cartridge as claimed in claim 5, wherein the adjusting ring (13) surrounds the vane bearing ring (7) at the outside or is arranged within the vane bearing ring (7).

* * * * *